United States Patent Office 3,346,600
Patented Oct. 10, 1967

3,346,600
SOLID PROPELLANT OXIDIZER AND ITS PREPARATION
Anthony J. Passannante, Metuchen, N.J., assignor to Esso Research and Engineering Company, a corporation of Delaware
No Drawing. Filed Dec. 21, 1960, Ser. No. 77,464
10 Claims. (Cl. 260—347.5)

This invention relates to a synthesis of a high-energy compound containing $NO_2$ and $NF_2$ groups by reaction of a polynitro alcohol with a compound containing $CNF_2$ groups and a functional group reactive with a hydroxy group of the alcohol.

The synthesis forms a product useful as an oxidizer for rocket propellant and explosive formulations. It forms a product of surprisingly good stability, low sensitivity to shock, and a comparatively favorable burning rate considering its high content of $NO_2$ and $NF_2$ groups. The product is an energetic source of F and O from the $NF_2$ and $NO_2$ groups for oxidation of metals, hydrogen and carbon.

A mixed $NF_2$—$NO_2$ product of value synthesized in accordance with the present invention is indicated to have the following composition:

(I) 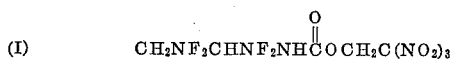

Nomenclature for the foregoing compound (I) is N[1,2 bis(difluoramino) ethyl]2′,2′,2′ trinitroethyl-carbamate since it contains the carbamic ester group —HNCOO—.

Generically, these compounds can be termed multi $NF_2$ and $NO_2$ group containing compounds derived from the polynitroalcohol and the $CNF_2$ compound containing an organic functional group.

The general scheme thus found for obtaining the $NF_2$ and $NO_2$ esters comprises reacting with a polynitroalcohol an $NF_2$ loaded compound containing a functional group, such as the isocyanate group —N=C=O, the carboxyl group —COOH, carbonyl chloride —COCl and carboalkoxy —COOCH₃. There are differences in the rates of reaction depending on the particular functional groups and size of molecule. The rates are usually best for smaller molecules with acidic functional substituent groups. The reactants should also resist undesired decomposition when undergoing esterification or condensation. Functional group substituted furans loaded with $NF_2$ groups are particularly suitable in this respect.

The following examples illustrate the synthesis and product evaluation:

Example 1

The di ($NF_2$) adduct of vinyl isocyanate is prepared by reacting vinyl isocyanate with $N_2F_4$ in a 1:1.25 mole ratio at 125° C. under a pressure less than 760 mm. Hg for 5 hours. This difluoramino compound is reacted with trinitroethanol, to form the condensation product (I).

In earliest preparations, the synthesis was carried out at very low temperatures, e.g. —76° C. for caution against an explosion. The reaction mixture was then allowed to stand for 5 days at room temperature (20° to 25° C.). The reaction mixture of white solid product and yellow liquid (excess trinitroethanol) was diluted with chloroform to form a solution. The chloroform was then evaporated off and n-pentane (in which the solid product was insoluble) was used to wash the solid product.

The washed white solid showed a melting point of 75° to 78° C. with slight depression of the melting point due to a small amount of trinitroethanol in the crystals.

Elemental analysis on the white solid was obtained:
Theory: F, 21.4%; N, 23.7%. Found: F, 21.8%; N, 23.5%.

In subsequent preparations the condensation reaction went safely and more efficiently at elevated reaction temperatures, e.g., up to 50° C. using 50% excess trinitroethanol. Catalysts have also been used. The white solid product was precipitated from chloroform solution by hexane and washed by hexane for purification.

The white solid product (I) showed no change in any property after 2 months and was found to withstand shock of 10 to 12 kg. inches.

The trinitrodifluoramino compound (I) has a good impulse value, Isp.=258 and a burning rate of 0.85 inch/second at 500 p.s.i. Accordingly, it is a valuable propellant formulation ingredient.

Various polynitroalcohols useful as reactants in the synthesis may be synthesized, as for example by reaction of polynitro compounds with formaldehyde or acetaldehyde.

Other mixed $NF_2$—$NO_2$ products of particular interest and utility are represented as follows:

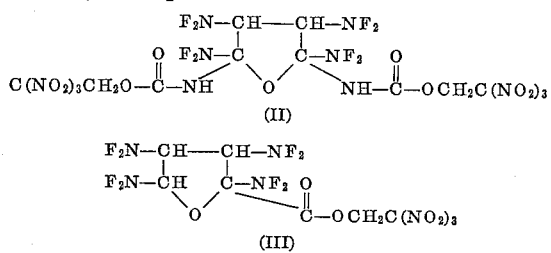

The condensation products of the $NF_2$ loaded furans have at least 1 $NF_2$ group for each carbon in the furan nucleus and may contain a ratio of 1 $NO_2$ per carbon in the ester side chain as in compounds II and III.

Example 2

A substituted furan having 4 $NF_2$ groups attached to carbon atoms in its ring nucleus and an isocyanate group as a substituent functional group reacts with trinitroethyl alcohol (used in excess) as in Example 1 and the condensation product is recovered in the same manner. The tetrakis ($NF_2$) carbamic ester product is $$C_4H_3O(NF_2)_4NHCOOCH_2C(NO_2)_3$$

The conditions of esterification or condensation reaction between the polynitroalcohol and the $CNF_2$ compound having the acid functional group are in general moderate, preferably about room temperature (20 to 25° C.) but may be in the range of —76° C. to +75° C. The pressures may be atmospheric, above or below atmospheric. Diluents and catalysts may be used. Also techniques of condensation and esterification may be used.

Using trinitroethanol as a reactant for ester formation with $CNF_2$ compounds having a functional group that forms an ester linkage, representative starting materials and ester products formed are shown as follows:

| $CNF_2$ reactant | Product |
|---|---|
| $C_4H_3O(NF_2)_4COCl$ | $C_4H_3O(NF_2)_4COOCH_2C(NO_2)_3$ |
| $C_4H_2O(NF_2)_4(-N=C=O)_2$ | $C_4H_2O(NF_2)_4[-NHCOOCH_2 C(NO_2)_3]_2$ |
| $C_4H_2O(NF_2)_4(-COOCH_3)_2$ | $C_4H_2O(NH_2)_4[-COOCH_2 C(NO_2)_3]_2$ |
| $C_4H_2O(NF_2)_5NCO$ | $C_4HO(NF_2)_5NHCOOCH_2C(NO_2)_3$ |
| $C_4H_2O(NF_2)_5COCl$ | $C_4HO(NF_2)_5COOCH_2C(NO_2)_3$ |
| $C_4HO(NF_2)_6COOCH_3$ | $C_4HO(NF_2)_6COOCH_2C(NO_2)_3$ |
| $C_4HO(NF_2)_6NCO$ | $C_4HO(NF_2)_6NHOOCH_2C(NO_2)_3$ |

In general, similar monoester and diester products are obtained having 4 to 6 $NF_2$ groups attached to the furan nucleus which has 1 to 2 side chains containing the polynitrocarbyl group, $C(NO_2)_3$.

The monofunctional and bifunctional furans used as $CNF_2$ reactants have a furan nucleus loaded by 4 to 6

NF₂ groups by reaction with excess N₂F₄ under suitable conditions, e.g., temperatures preferably in the range of about 100° C. to 250° C. under pressures ranging from subatmospheric to superatmospheric pressures, and in appropriate contact times from a minute to a number of hours.

The CNF₂ furan derivatives having suitable functional groups and preferred methods of preparing these derivatives are disclosed and claimed in U.S. application Serial No. 77,462 filed December 21, 1960 by A. J. Passannante et al. and Serial No. 77,465 filed December 21, 1960 by J. R. Michael et al.

The multi-NF₂ furyl compounds having the side chain ester linkage, e.g., —COOCH₂C(NO₂)₃ or

—NHCOOCH₂C(NO₂)₃ bear the prefix tetrakis for four NF₂ groups, pentakis for five NF₂ groups, and hexakis to six NF₂ groups on the furan nucleus. All of these compounds have very high energy values as oxidizers for making propellants, explosives, or otherwise generating high temperature gas products.

It has been established that the NF₂—NO₂ oxidizers made in accordance with the principles of the present invention are among the best compounds made for use as rocket propellant components, especially solid composites which contain powdered metals such as B, Be, Al, Mg, and Li.

What is claimed is:

1. The multi-NF₂ furyl compound having the composition:

C₄H₃O(NF₂)₄COOCH₂C(NO₂)₃

2. The multi-NF₂ furyl compound having the composition:

C₄H₂O(NF₂)₄[—COOCH₂C(NO₂)₃]₂

3. The multi-NF₂ furyl compound having the composition:

C₄H₂O(NF₂)₄[—NHCOOCH₂C(NO₂)₃]₂

4. The multi-NF₂ furyl compound having the composition:

C₄H₃O(NF₂)₄NHCOOCH₂C(NO₂)₃

5. Pentakis (NF₂) furyl 2,2,2 trinitroethyl carbamate.

6. A compound containing 4 to 6 NF₂ groups linked to carbon atoms in a furan nucleus which has one to two side chains having an ester linkage to a polynitrocarbyl group, —C(NO₂)₃.

7. Process of preparing an oxidizer containing nitro and difluoramino groups which comprises reacting trinitroethanol with di (NF₂) adduct of vinyl isocyanate at a temperature in the range of about —76° C. to about 50° C. and recovering the resulting esterification reaction product.

8. The compound N[1,2 bis (difluoramino) ethyl] 2′,2′,2′ trinitroethyl-carbamate having the composition:

$$CH_2NF_2CHNF_2NH\overset{O}{\overset{\|}{C}}OCH_2C(NO_2)_3$$

9. Process for preparing an oxidizer containing nitro and difluoramino groups which comprises reacting trinitroethanol with a CNF₂ compound selected from the group consisting of di (NF₂) adduct of vinyl diisocyanate and N₂F₄ adducts of mono and bifunctional substituted furans, the functional substituents being selected from the group consisting of —N=C=O, —COOH, —COCl, and —COOCH₃, an NF₂ group being attached to each carbon of the furan nucleus of the substituted furan, for condensation of the CNF₂ compound with trinitroethanol, and recovering the resulting product having a —C(NO₂)₃ group linked to the CNF₂ compound through an ester linkage of the reactive functional group.

10. Process of preparing an oxidizer containing nitro and difluoramino groups which comprises reacting trinitroethanol with tetrakis (NF₂) furyl isocyanate and recovering the resulting ester product having the composition:

C₄H₃O(NF₂)₄NHCOOCH₂C(NO₂)₃

No references cited.

NICHOLAS S. RIZZO, *Primary Examiner.*

L. D. ROSDOL, R. L. CAMPBELL, *Examiners.*

J. WHISLER, *Assistant Examiner.*